United States Patent
Bajko et al.

(10) Patent No.: US 8,295,171 B2
(45) Date of Patent: Oct. 23, 2012

(54) SESSIONS IN A COMMUNICATION SYSTEM

(75) Inventors: Gabor Bajko, Budapest (HU); Gabor Jaro, Budapest (HU); József Varga, Nagydobsza (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/077,771

(22) Filed: Mar. 31, 2011

(65) Prior Publication Data

US 2011/0182285 A1 Jul. 28, 2011

Related U.S. Application Data

(63) Continuation of application No. 10/759,453, filed on Jan. 20, 2004, now Pat. No. 7,945,275.

(30) Foreign Application Priority Data

Oct. 21, 2003 (GB) .................................. 0324596.6

(51) Int. Cl.
*G01R 31/08* (2006.01)
*H04L 12/28* (2006.01)
(52) U.S. Cl. ........................................ 370/230; 370/254
(58) Field of Classification Search .................. 370/352, 370/341, 338, 356, 230; 455/466; 709/225, 709/229, 223
See application file for complete search history.

(56) References Cited

U.S. PATENT DOCUMENTS

| 5,835,484 A | 11/1998 | Yamato et al. |
| 7,509,425 B1 | 3/2009 | Rosenberg |
| 2002/0194323 A1 | 12/2002 | Chantrain et al. |
| 2003/0035401 A1* | 2/2003 | Shaheen et al. ................ 370/341 |
| 2004/0095923 A1* | 5/2004 | Ejzak et al. .................... 370/352 |
| 2004/0095958 A1 | 5/2004 | Ejzak et al. |
| 2004/0215787 A1 | 10/2004 | Gibson et al. |

FOREIGN PATENT DOCUMENTS

| EP | 1265414 A1 | 12/2002 |
| WO | WO-01/35294 A1 | 5/2001 |
| WO | WO-02/096145 A1 | 11/2002 |

OTHER PUBLICATIONS

Notification of Final Office Action dated Feb. 25, 20120, issued by the Japanese Patent Office in connection with counterpart Japanese application No. 2006-536207.
Rosenberg, et al., "Networking Group request for comments: RFC 3262, Reliability of provisional responses in teh Session Initiation Protocol (SIP), Jun. 2002".
Russian Office Action, Russian Application No. 2006117309/09(018853), pp. 1-2, Englisth Translation: pp. 1-2.

* cited by examiner

*Primary Examiner* — Kiet Doan
(74) *Attorney, Agent, or Firm* — Mintz, Levin, Cohn, Ferris, Glovsky & Popeo, P.C.

(57) ABSTRACT

A method in a communications system for handling responses to messages includes a step of sending a message from a first party to a second party. A response to the message is sent, with the response including at least one parameter in breach of a policy for a communication between the first party and the second party. A network controller detects that the response includes at least one parameter breaching the policy. The at least one parameter is modified to be consistent with the policy.

4 Claims, 3 Drawing Sheets

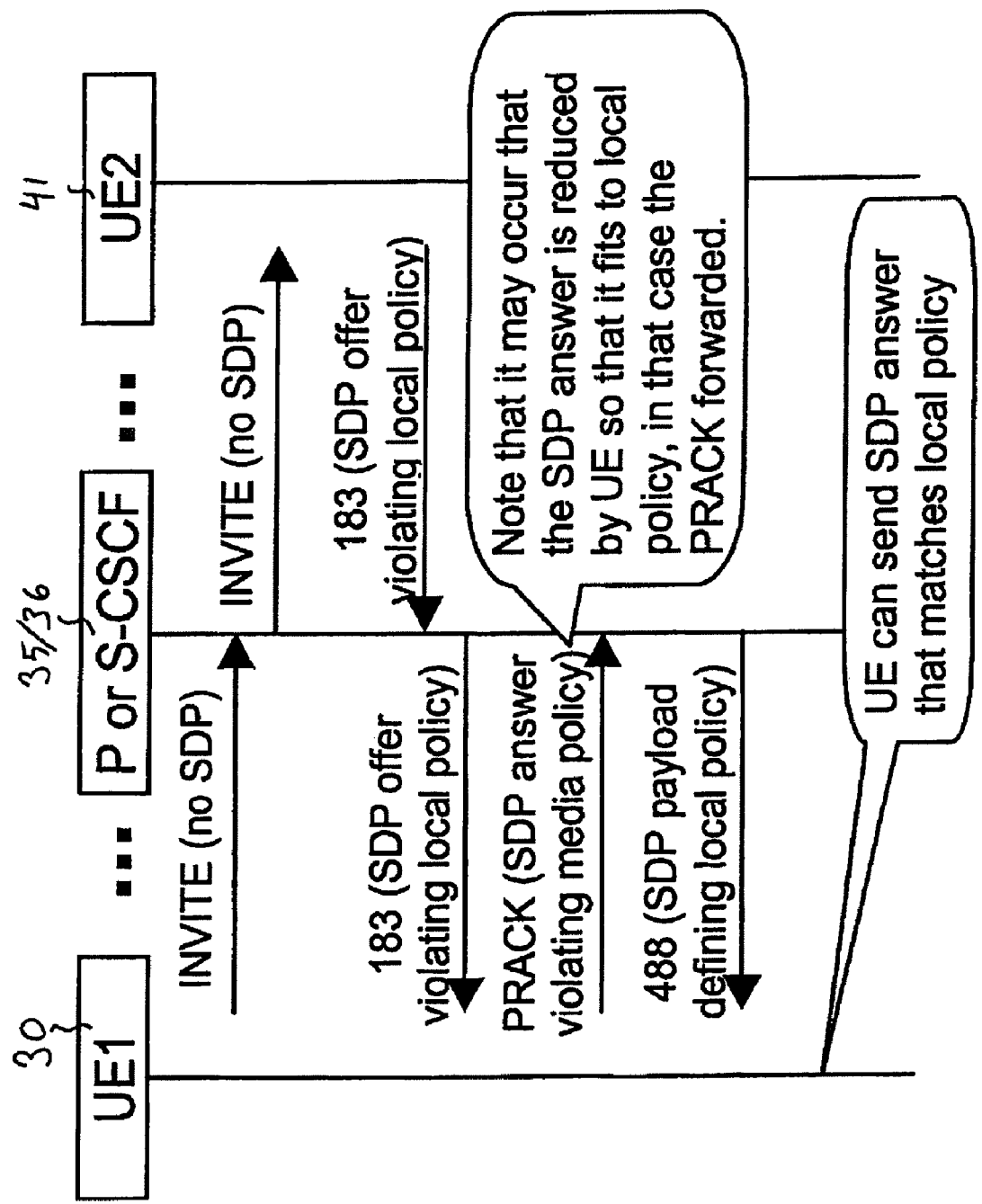

SESSIONS IN A COMMUNICATION SYSTEM

CROSS REFERENCE TO RELATED APPLICATION

This application is a continuation application of U.S. patent application Ser. No. 10/759,453, filed on Jan. 20, 2004, now U.S. Pat. No. 7,945,275 entitled "SESSIONS IN A COMMUNICATION SYSTEM," which claims the benefit under 35 U.S.C. §119 of Great Britain Patent Application No. 0324596.6, filed Oct. 21, 2003, contents of the aforementioned applications are hereby incorporated by reference herein in their entirety.

The present invention relates to communication systems, and in particular, to policy control in association with sessions provided by means of a communication system.

A communication system can be seen as a facility that enables communication sessions between two or more entities such as user equipment and/or other nodes associated with the communication system. The communication may comprise, for example, communication of voice, data, multimedia and so on. A user equipment may, for example, be provided with a two-way telephone call or multi-way conference call. A user equipment may also be provided with a connection to an application server (AS), for example a service provider server, thus enabling use of services provided by the application server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems proving wireless communication for user equipment are known. An example of the wireless systems is the public land mobile network (PLMN). The PLMNs are typically based on cellular technology. In cellular systems, a base transceiver station (BTS) or similar access entity serves wireless user equipment (UE) known also as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the mobile network to other networks, for example to a public switched telephone network (PSTN) and/or other communication networks such as an IP (Internet Protocol) and/or other packet switched data networks. For example, if a requested service is provided by a service provider located in other network, the service request is routed via the mobile network to the other network and then to the service provider.

An example of the services that may be offered for users such as the subscribers to a communication system is the so called multimedia services. An example of the communication systems enabled to offer multimedia services is the Internet Protocol (IP) Multimedia network. IP Multimedia (IM) functionalities can be provided by means of a IP Multimedia Core Network (CN) subsystem, or briefly IP Multimedia subsystem (IMS). The IMS includes various network entities for the provision of the multimedia services.

The third generation partnership project (3GPP) has defined use of the general packet radio service (GPRS) as a backbone communication system for the provision of the IMS services. Therefore the GPRS will be used in this specification as an example of a possible backbone communication system enabling the multimedia services. The Third Generation Partnership Project (3GPP) has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia (IM) domain.

The latter of these, the IM domain, is for ensuring that multimedia services are adequately managed. The 3G IM domain supports the Session Initiation Protocol (SIP) as developed by the Internet Engineering Task Force (IETF). Session Initiation Protocol (SIP) is an application-layer control protocol for creating, modifying and terminating sessions with one or more participants (endpoints).

The SIP can establish, modify, and terminate multimedia sessions, for example conferences. However, the details of the session, such as the type of media, codec, or sampling rate, cannot be described. Instead, the body of a SIP message contains a description of the session, encoded in Session Description Protocol (SDP) format. A mechanism called offer/answer model has been defined, this enabling two entities to make use of the SDP to arrive at a common view of a multimedia session between them. In the model, one participant offers the other party a description of the desired session from their perspective, and the other participant answers with the desired session from their perspective. The other participant may e.g. reduce the offer. 3GPP allows operators of IP Multimedia Subsystems to define allowed media parameters for sessions in their network; these are either generic local policies or media policies, or subscription based restrictions. In these networks only the allowed media can be established. SDPs violating the policies are rejected by the network.

Although handling of SIP requests containing SDP has been described for the 3GPP, handling of SIP responses, such as responses with payload, is not yet dealt with. The SIP allows sending of SDP in SIP responses. However, it is not possible to reject such responses if the SDP breaches media policy, such as policy set by an operator but not known to the user.

Embodiments of the present invention aim to address one or several of the above problems.

According to one embodiment of the present invention, there is provided a method in a communication system for handling responses to messages. The method comprises the steps of sending a message from a first party to a second party, sending a response to the message, the response including at least one parameter in breach of a policy for the communication between the parties, detecting in a network controller that the response includes at least one parameter breaching the policy, and modifying the at least one parameter to be in line with the policy.

According to another embodiment there is provided a controller for a communication system configured to handle responses and requests between parties of communication sessions, forward a message from a first party to a second party, check if a response to the message includes at least one parameter in breach of a policy for the communication between the parties, and modify the at least one parameter to be in line with the policy.

According to yet another embodiment there is provided a communication system for providing communication sessions between parties connected thereto, the communication system comprising a controller configured to handle responses and requests between parties of communication sessions, forward a message from a first party to a second party, check if a response to the message includes at least one parameter in breach of a policy for the communication between the parties, and modify the at least one parameter to be in line with the policy.

In a more specific embodiment at least one parameter is modified by the controller. In another embodiment the at least one parameter is modified by the first party. The response may passed unmodified from the second party to the first party. A check may be made by the controller if a further message from the first party responding the response includes at least one parameter in breach of the policy.

Embodiments may provide advantage in handling of sessions with non-allowable parameters. The handling may be consistent. The system may better foresee various possible situations caused by conflicting policies.

For better understanding of the present invention, reference will now be made by way of example to the accompanying drawings in which:

FIG. 3 is a signalling flowcharts illustrating operation of another aspect of the invention.

Certain embodiments of the present invention will be described in the following by way of example, with reference to the exemplifying architecture of a third generation (3G) mobile communications system. However, it shall be appreciated that the embodiments may be applied to any suitable communication system.

Figure 1:
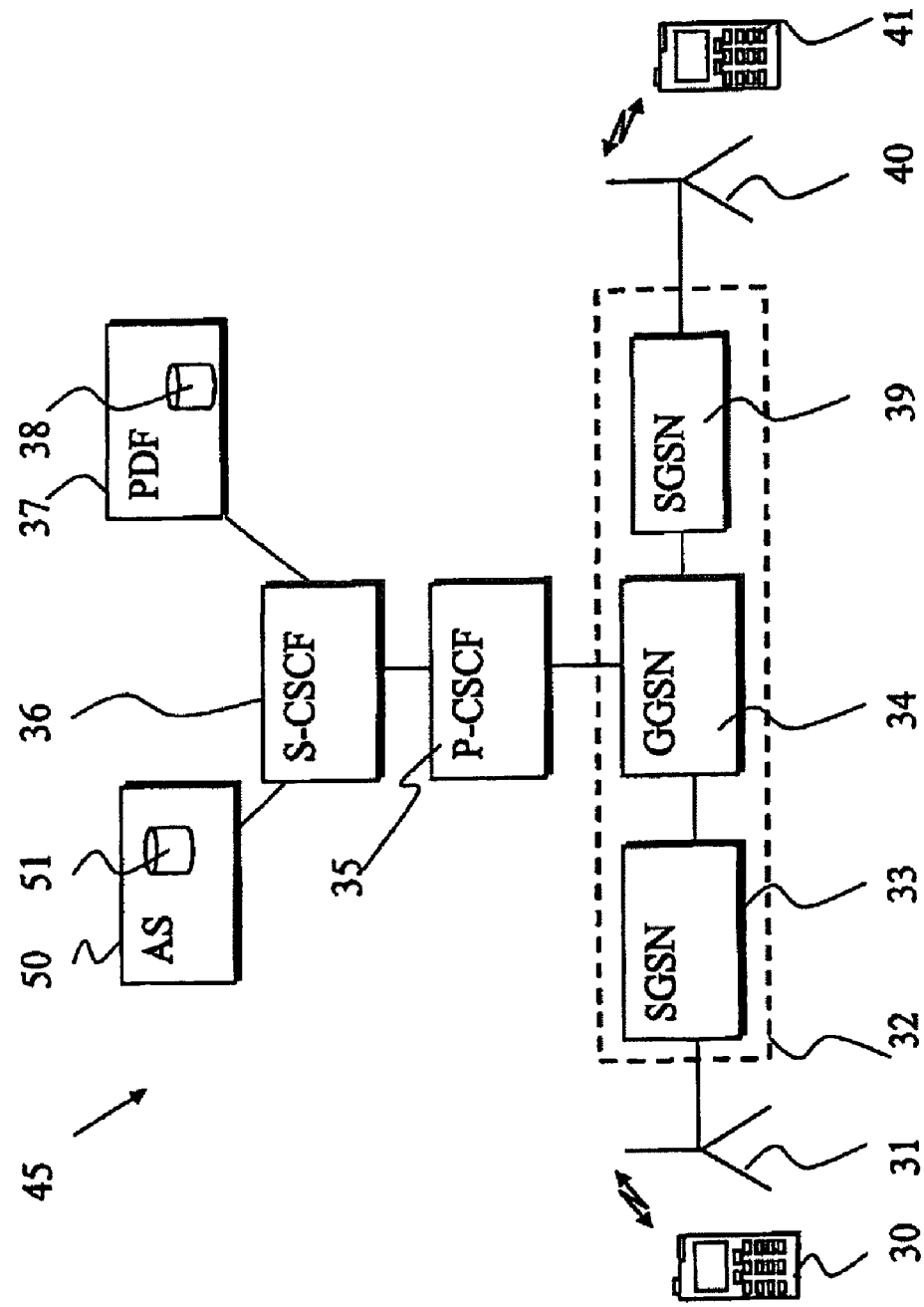
FIG. 1 shows one embodiment of the invention.

Reference is made to FIG. 1 which shows an example of a network architecture wherein the invention may be embodied. In FIG. 1 an IP Multimedia Network 45 is provided for offering IP multimedia services for IP Multimedia Network subscribers.

As described above, IP Multimedia (IM) functionalities can be provided by means of a mobile communication system. A mobile communication system is typically arranged to serve a plurality of mobile user equipment usually via a wireless interface between the user equipment and at least one base station of the communication system. The mobile communication system may logically be divided between a radio access network (RAN) and a core network (CN).

In the system base stations 31 and 40 are arranged to transmit signals to and receive signals from mobile user equipment 30, 41 of mobile users i.e. subscribers via a wireless interface between the user equipment and the radio access network. Correspondingly, a mobile user equipment is able to transmit signals to and receive signals from the radio access network via the wireless interface.

In the shown arrangement the user equipment 30, 41 may access the IMS network 45 via the access network associated with base station 31, 40, respectively. It shall be appreciated that, although, for clarity reasons FIG. 1 shows two base stations only, a typical communication network system usually includes a number of base stations.

A mobile user equipment may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only two mobile stations are shown in FIG. 1 for clarity, a number of mobile stations may be in simultaneous communication with base stations of a mobile communication system.

The core network (CN) entities typically include various switching and other control entities and gateways for enabling the communication via a number of radio access networks and also for interfacing a single communication system with one or more communication system such as with other cellular systems and/or fixed line communication systems. In the 3GPP systems the radio access network controller is typically connected to an appropriate core network entity or entities such as, but not limited to, a serving general packet radio service support node (SGSN), see controllers 33 and 39 of FIG. 1. The radio access network is in communication with the serving GPRS support node via an appropriate interface, for example on an Iu interface. Although not shown, the SGSN typically has access to designated subscriber database configured for storing information associated with the subscription of the respective user equipment. The serving GPRS support node, in turn, typically communicates with a gateway GPRS support node via the GPRS backbone network 32. This interface is commonly a switched packet data interface.

In a 3GPP network, a packet data session is established to carry traffic flows over the network. Such a packet data session is often referred as a packet data protocol (PDP) context. A PDP context may include a radio bearer provided between the user equipment and the radio network controller, a radio access bearer provided between the user equipment, the radio network controller and the SGSN, and switched packet data channels provided between the serving GPRS service node and the gateway GPRS service node. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, radio access bearers (RAB) need to be established which commonly allow for data transfer for the user equipment. The implementation of these logical and physical channels is known to those skilled in the art and is therefore not discussed further herein.

The communication systems have developed in the direction wherein services are provided for the user equipment by means of various functions of the data network that are handled by controller entities, such as servers. For example, in the current third generation (3G) wireless multimedia network architectures it is assumed that several different servers providing various control functions are used for the service provision control. These include functions such as the call state control functions (CSCFs). The call state control functions may be divided into various categories such as a proxy call state control function (P-CSCF), interrogating call state control function (I-CSCF), and serving call state control function (S-CSCF). It shall be appreciated that similar functions may be referred to in different systems with different names. For example, in certain applications the CSCFs may be referenced to as the call session control functions.

A user who wishes to use services provided by the IMS system may need first to register with a serving controller, such as the serving call session control function (S-CSCF) 36. As shown in FIG. 1, communication between the S-CSCF 36 and the user equipment may be routed via at least one proxy call session control function (P-CSCF) 35. The proxy CSCF 35 is thus for proxying messages from the GGSN 34 to a serving call session control function 36. The serving controller, i.e. CSCF 36 in FIG. 1, in turn, provides the control entity the user equipment 30 needs to be registered with. The registration is required to enable the user equipment to request for a service from the communication system.

A policy control entity 37 may also be provided. The policy control entity 37 may be configured to store required policy information in a database 38 thereof. The network entities may query the policy control entity for various purposes, such as for obtaining information regarding the media policy of a particular user. The policy control entity may be provided by means of a policy decision function (PDF), which is connected to P-CSCF and GGSN.

FIG. 1 shows also an application server 50. The user equipment may connect, via the GPRS network, to the application server that is connected to one or more data networks such as, but not limited to, the exemplifying Internet Protocol (IP) network. It shall be appreciated that a great number of application servers may be connected to each data network.

Although this is not always necessary, the system of FIG. 1 may further be arranged such that a user who has been provided with required communication resources by the backbone network and is registered to the serving controller 36 has to initiate the use of services offered by the application server 50 by sending a request for the desired service to the serving controller over the communication system.

The embodiments are based on the realisation that it might be advantageous if an predefined action can be taken after detection of a breach of media policy. The action is preferably performed in a proxy network element, such as the P-CSCF 35.

The more detailed exemplifying embodiments described below deal with messages, such as SIP responses, containing a session parameter such as an offer that is not in accordance with the operator's media policy stored in the PDF 37, and therefore actions may need to be performed in order to bring the at least one breaching parameter in line with the policy.

Figure 2:
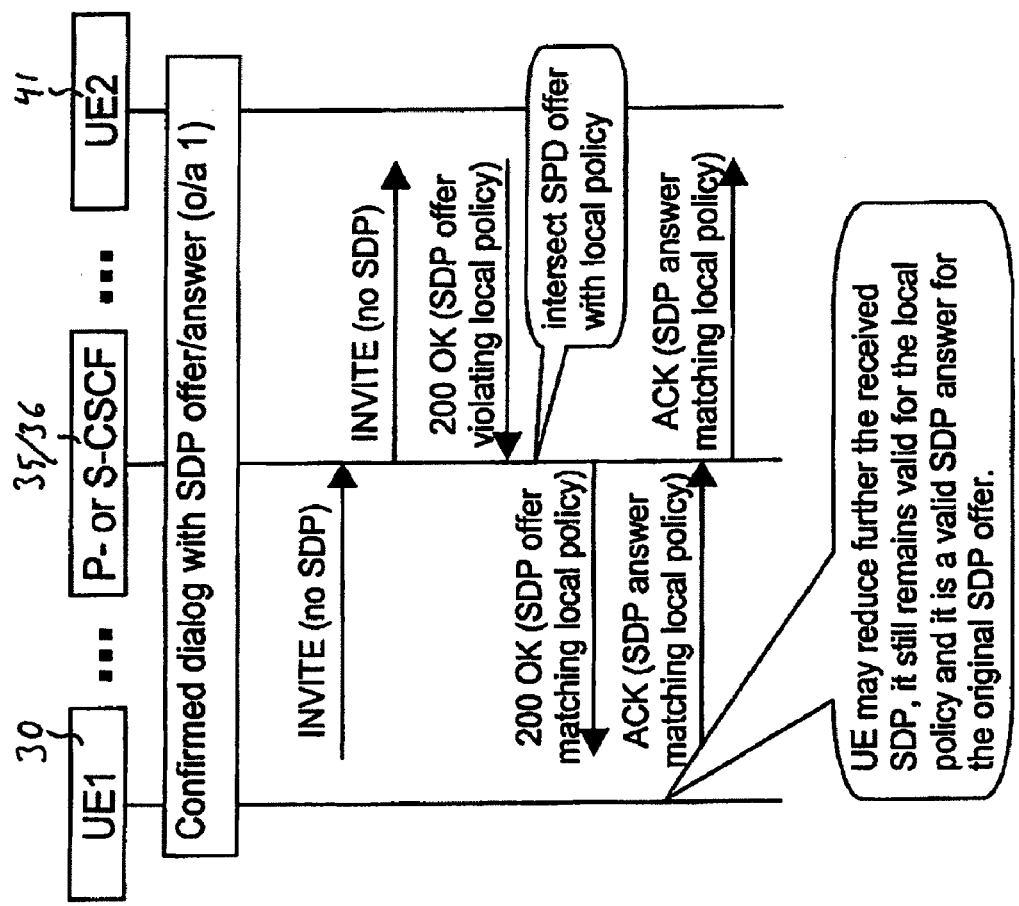
FIG. 2 is a signalling flowcharts illustrating operation of an aspect of the invention.

As shown in FIG. 2, an appropriate CSCF may modify the parameters before forwarding them. The 200 OK sent from the second user equipment 41 in response to an 'INVITE' from the first user equipment 30 contains an SDP offer that breaches media policy. The CSCF modifies the offer such that the SDP offer is in line with the media policy before it is sent further to the first user equipment 30 as an SDP offer. The answer in the ACK will be acceptable by media policy.

If the reduced media is not satisfactory for the parties (in worst case it may occur that in the intersection all media are annulled), they can initiate a new reINVITE. This is possible since the multimedia session is not released by the network.

In accordance with an alternative shown in FIG. 3 an appropriate CSCF may ignore the problem and forward the unmodified SIP message containing the SDP offer. The provisional response from the second user equipment for an INVITE from the first user equipment may contain an SDP offer that breaches media policy. In other word, the SDP offer may be forwarded as it were accepted. The CSCF then waits for modified and allowable session parameter answer from the other party. The SDP answer may be received in a PRACK request which is then checked against the media policy. If it is not acceptable, the PRACK request is rejected. The CSCF may thus reject offer/answer if the final parameters still breach the media policy The rejection may contain the allowed media policy. This may be provided in accordance with the FIG. 2.

A more detailed example for operation of the P-CSCF 35 in accordance with an embodiment will be described next. When the P-CSCF 35 receives an SIP request containing an SDP offer, the P-CSCF may examine the media parameters in the received SDP. If the P-CSCF 35 finds any media parameters which are not allowed on the network, for example because of a local policy, the P-CSCF may return a 'Not Acceptable Here' response containing SDP payload. The SDP payload may contain either all the media types, codecs and other SDP parameters which are allowed according to the local policy, or, based on configuration by the operator of the P-CSCF, a subset of these allowed parameters. This subset may depend on the content of the received SIP request.

When the P-CSCF receives a reliable provisional SIP response, such as the SIP 183 message of FIG. 3, containing SDP offer, the P-CSCF may be configured not to examine the media parameters in the received SDP offer. Thus, even if the offer contains media parameters which are not allowed on the network by a local policy the SDP may be allowed to pass transparently the P-CSCF 35. This may be advantageous since it may not be possible for the P-CSCF to reject a SIP response. Instead, the P-CSCF may take action based on the succeeding PRACK request containing the SDP answer for this offer and therefore this is checked. If necessary, i.e. the SDP answer reduced by the user equipment (UE) still breaches local policy, the P-CSCF may return a 'Not Acceptable Here' response containing the local policy that is allowed SDP payload.

When the P-CSCF receives a 2xx final SIP response for an INVITE request in a confirmed dialog, i.e. for a reINVITE, that contains an SDP offer, the P-CSCF may examine the media parameters in the received SDP offer. If the P-CSCF finds media parameters not allowed on the network, for example by local policy, the P-CSCF may intersect the SDP offer with the local policy, as is shown in FIG. 2. This way it may be ensured that the SDP answer sent in the 'ACK' request is allowed by the local policy and it is a valid answer for the SDP offer originally received in P-CSCF as well.

A more detailed example wherein the operations in accordance with an embodiment are performed in the S-CSCF 36 will be described next. When the S-CSCF 36 receives an SIP request containing SDP, the S-CSCF may examine the media parameters in the received SDP. If the S-CSCF finds any media parameters which are not allowed based on either local policy or the subscription, the S-CSCF may return a 'Not Acceptable Here' response containing SDP payload. As above, the SDP payload may contain either all the media types, codecs and other SDP parameters which are allowed according to the local policy and users subscription or, based on configuration by the operator of the S-CSCF, a subset of these allowed parameters. This subset may depend on the content of the received SIP request.

When the S-CSCF receives a reliable provisional SIP response containing an SDP offer, the S-CSCF may be configured not to examine the media parameters in the received SDP offer. Thus even media parameters which are not allowed on the network by local or other policy may be allowed, as it may not be possible to reject a SIP response. The P-CSCF may then check the subsequent PRACK request containing the SDP answer for this offer, and if necessary, i.e. the SDP answer reduced by the UE, still breaches local policy, it proceeds as described above for SIP requests.

When the S-CSCF receives a 2xx final SIP response for an INVITE request in a confirmed dialog that contains an SDP offer, the S-CSCF may examine the media parameters in the received SDP offer. If the S-CSCF finds any media parameters which are not allowed on the network by local policy, the S-CSCF shall intersect the SDP offer with the local policy. This way it may be guaranteed that the SDP answer sent in the ACK message is allowed by the local policy and it is a valid answer for the SDP offer originally received in S-CSCF as well. Note that it is not possible to reject an ACK in SIP protocol.

In accordance with a possibility the communication system is configured such that the SIP 200 OK for an initial INVITE cannot contain an SDP offer. In this case either the initial INVITE request may contain the offer or there may be a provisional reliable response with SDP offer.

The following deals briefly with inappropriate SDP models the network may need to be able to handle. In accordance with a scenario an SDP offer is not answered according to the SDP offer/answer model. In this case the SDP offer may be dropped. In another scenario there is no SDP payload in the SIP message, although the SDP offer/answer model mandates it. The intermediate server may then behave transparently. The SIP message may also contain an invalid SDP offer, for example syntactical, semantic error or SDP offer/answer model is broken. This may be considered as an annulled offer. The SIP message may also contains an invalid SDP answer. The corresponding offer is dropped, and P-CSCF sends no policy setup information to policy decision function.

It should be appreciated that whilst embodiments of the present invention have been described in relation to user equipment such as mobile stations, embodiments of the present invention are applicable to any other type of equipment.

The examples of the invention have been described in the context of an IMS system and GPRS networks. This invention is also applicable to any other access techniques including code division multiple access, frequency division multiple access or time division multiple access as well as any hybrids thereof. Furthermore, the given examples are described in the context of the so called all IP networks with all IP entities. This invention is also applicable to any other appropriate communication systems, either wireless or fixed line systems and standards and protocols. Examples of other possible communication systems enabling wireless data communication services, without limiting to these, include third generation mobile communication system such as the Universal Mobile Telecommunication System (UMTS), i-phone or CDMA2000 and the Terrestrial Trunked Radio (TETRA) system, the Enhanced Data rate for GSM Evolution (EDGE) mobile data network. Examples of fixed line systems include the diverse broadband techniques providing Internet access for users in different locations, such as at home and offices. Regardless the standards and protocols used for the communication network, the invention can be applied in all communication networks wherein policy control is required in association with sessions.

The embodiment of the invention have been discussed in the context of a proxy and servicing call state control functions. Embodiments of the invention can be applicable to other network elements where applicable.

It is also noted herein that while the above describes exemplifying embodiments of the invention, there are several variations and modifications which may be made to the disclosed solution without departing from the scope of the invention as defined in the appended claims.

The invention claimed is:

1. A method comprising:
forwarding a first request from a first user equipment to a second user equipment;
forwarding a first response containing a session description protocol offer from the second user equipment to the first user equipment;
receiving a second request from the first user equipment containing a session description protocol answer;
determining that the session description protocol answer contains a parameter in breach of a local policy; and
returning a second response indicating that the session description protocol answer is not acceptable, the second response containing a local policy allowed session description protocol payload.

2. A network controller configured to at least:
forward a first request from a first user equipment to a second user equipment;
forward a first response containing a session description protocol offer from the second user equipment to the first user equipment;
receive a second request from the first user equipment containing a session description protocol answer;
determine that the session description protocol answer contains a parameter in breach of a local policy; and
return a second response indicating that the session description protocol answer is not acceptable, the second response containing a local policy allowed session description protocol payload.

3. A user equipment configured to at least:
send a first request to a network controller, the network controller forwarding the first request to another user equipment;
receive a first response containing a session description protocol offer from the other user equipment, the first response forwarded by the network controller;
send a second request containing a session description protocol answer to enable the network controller to determine whether the session description protocol answer contains a parameter in breach of a local policy; and
receive a second response that the session description protocol answer is not acceptable, the second response containing a local policy allowed session description protocol payload, the second response forwarded by the network controller.

4. A method comprising:
sending a first request to a network controller, the network controller forwarding the first request to another user equipment;

receiving a first response containing a session description protocol offer from the other user equipment, the first response forwarded by the network controller;

sending a second request containing a session description protocol answer to enable the network controller to determine whether the session description protocol answer contains a parameter in breach of a local policy; and receiving a second response that the session description protocol answer is not acceptable, the second response containing a local policy allowed session description protocol payload, the second response forwarded by the network controller.

* * * * *